United States Patent
Oishi

(10) Patent No.: US 7,359,309 B2
(45) Date of Patent: Apr. 15, 2008

(54) OPTICAL DISK, THIN PLASTIC SHEET, AND METHOD FOR AFFIXING DISPLAY SHEET TO DISK SUBSTRATE

(75) Inventor: Kengo Oishi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 745 days.

(21) Appl. No.: 10/760,377

(22) Filed: Jan. 21, 2004

(65) Prior Publication Data

US 2004/0184390 A1    Sep. 23, 2004

(30) Foreign Application Priority Data

Jan. 23, 2003  (JP)  .................. P. 2003-014839
Jan. 24, 2003  (JP)  .................. P. 2003-016393

(51) Int. Cl.
*G11B 7/24*  (2006.01)

(52) U.S. Cl. .................. 369/275.1; 369/286; 369/288

(58) Field of Classification Search .. 369/275.1–275.5, 369/286, 287, 280, 288, 277, 278; 428/64.4
See application file for complete search history.

(56) References Cited

U.S. PATENT DOCUMENTS 5,982,737 A * 11/1999 Takagishi et al. ........ 369/275.1
6,657,948 B1 * 12/2003 Tajima et al. ............... 369/286
6,735,166 B1 *  5/2004 Kusafuka et al. ......... 369/275.3
2003/0043712 A1 *  3/2003 Nakamura et al. ........ 369/47.53

FOREIGN PATENT DOCUMENTS

| EP | 0422774 A2   | 4/1991  |
|----|--------------|---------|
| EP | 0 836 0182 A2| 4/1998  |
| EP | 0 938 082 A2 | 8/1999  |
| EP | 1052630 A1   | 11/2000 |
| EP | 1 439 538 A2 | 7/2004  |
| JP | 3-97135 A    | 4/1991  |
| JP | 2000-322767 A| 11/2000 |
| JP | 2002-92965 A | 3/2002  |
| JP | 2002-367234 A| 12/2002 |

* cited by examiner

*Primary Examiner*—Ali Neyzari
(74) *Attorney, Agent, or Firm*—Sughrue Mion, PLLC

(57) ABSTRACT

An optical disk is provided with a disk substrate having a recording layer formed on one surface of a substrate and a cover sheet applied over the recording layer; and a display sheet which is affixed to a surface of the disk substrate opposite to a surface covered with the cover sheet and which has substantially the same physical characteristic as that of the cover sheet. The display sheet and the cover sheet are substantially brought into coincidence with each other in terms a direction of heat contraction and a heat contraction rate.

19 Claims, 11 Drawing Sheets

OPTICAL DISK, THIN PLASTIC SHEET, AND METHOD FOR AFFIXING DISPLAY SHEET TO DISK SUBSTRATE

BACKGROUND OF THE INVENTION

1. Field of the Invention

The invention relates to an optical disk including a substrate, a recording layer formed on one side of the substrate, and a cover sheet coated over the recording layer, as well as to a method for affixing a display sheet on the optical disk. The invention relates to a disk for recording a large volume of information, and more particularly, to a disk which performs recording operation through use of a UV ray of shorter wavelength, such as a Blu-Ray (blue ray) disk.

2. Description of the Related Art

Development of an optical disk for realizing large-capacity recording has been pursued with a view toward commercialization of an optical disk to be used for performing recording and playback operation through use of a high power violet laser light source. As shown in FIG. 10, a DVD is constructed by laminating together two disk substrates, each having a thickness of 0.6 mm. In contrast, an optical disk 1 adopts a so-called "0.1 mm cover layer system," wherein a recording surface 5 formed on a substrate 3 is covered with a thin cover layer 7 of 0.1 mm thickness. The reason why the cover layer 7 is made thin to a thickness of 0.1 mm is that a reduction in thickness is indispensable for reducing the diameter of a laser beam spot to about one-fifth the diameter of a laser beam spot adopted by a current DVD.

Specifically, if the wavelength of the light source is shortened from 650 nm or thereabouts used for a related-art DVD to 405 nm or thereabouts and a numerical aperture (NA) is increased from 0.6 to 0.85, the diameter of the beam spot can be reduced. However, the higher the NA, the smaller the allowable range of inclination of the optical axis (tilt margin) with reference to the recording surface. For this reason, expansion of the tilt margin to the same extent as that of the current DVD is enabled by reducing the thickness of the cover layer 7. As a result, warpage and inclination of the optical disk 1 or an error in assembly operation performed by a system can be addressed to the same level as that achieved by the DVD (see "Nikkei Electronics," pp. 79-86, Mar. 11, 2002.).

The cover layer 7 of the optical disk is usually coated with UV hardening resin and then exposed to UV rays for hardening. Organic-pigment-based recording material is used for the recording layer 5. Hence, an UV hardening method for use in hardening the cover layer 7 is not preferable. For this reason, affixing of a thin-layer plastic sheet (polycarbonate, TAC, PET, or the like) on the recording layer 5 as a cover sheet is conceivable. According to the thin-layer plastic sheet affixing method, an appropriate thickness of the cover layer 7 is obtained, and no damage is inflicted on the organic-pigment-based recording material, which would otherwise be caused when UV hardening is performed. Therefore, the thin-layer plastic sheet affixing method can be said to be a preferable cover layer formation method. However, as shown in FIG. 11, a plastic sheet 9 is additionally subjected to an extension process during the manufacturing process, for ensuring strength and the accuracy of thickness. Consequently, the plastic sheet 9 possesses a thermal contraction characteristic (Bowing phenomenon), wherein a given directionality is imparted to the direction of heat contraction (see the directions indicated by the arrows provided in circles shown in FIG. 11). When the plastic sheet 9 is applied integrally over the substrate 3 as a cover sheet 11 of the recording layer 5 as shown in FIG. 12, no problem arises when the optical disk is stored in an ordinary environment. However, when an optical disk is likely to be stored at high temperature and high humidity (e.g., when an optical disk is placed in a car), the cover sheet 11, which causes heat contraction, pulls the substrate 3 in the same manner as does bimetal. There arises a risk of warpage in a disk substrate 13. If such warpage arises in the disk substrate 13, a tilt change α which arises at the time of radiation of a laser becomes greater as shown in FIG. 13, thereby impairing the appearance of the optical disk as well as deteriorating read/write characteristics of the same.

In JP-A-2002-92965, there has also already been proposed an optical disk, wherein an ultra-thin transparent cover layer is provided on a substrate with information signals formed therein, and wherein the transparent-cover-side of the substrate is exposed to a laser beam, to thereby record/reproduce the information signals. Since an optical disk substrate can usually be formed to a thickness of about 1.2 mm, the optical disk enables accurate transfer of irregularities even when the disk substrate is manufactured by means of an injection molding method. The laser beam used for recording/reproduction is radiated onto the side of the substrate covered with the ultra-thin transparent cover layer, and hence sufficient addressing of an increase in recording capacity has come to be feasible. As mentioned above, the Blu-Ray disk requires a large-diameter anti-reflection characteristic, and hence a recording surface of the substrate is coated with a ultra-thin transparent cover layer, to thereby stabilize a characteristic of the disk and maintain the appearance of the disk when in use.

In this case, the cover layer of the Blu-Ray disk has a thickness of about 0.1 mm. After the disk has been coated with UV curing resin, the disk is usually subjected to hardening treatment. Although various Blu-Ray recording methods have already been proposed, users expect rewritability or the like.

In order to ensure rewritability, an organic-pigment-based recording material is frequently used. Although a UV laser beam is used for recording operation, application of the UV-ray curing method to curing of a cover layer is less desirable as mentioned above. As a result of a thin-layer plastic sheet (polycarbonate, TAC, PET, or the like) being affixed to the disk, an appropriate cover thickness is obtained. Further, UV curing is not performed, and hence damage is less frequently inflicted on the organic-pigment-based recording material. Therefore, affixing of a thin-layer plastic sheet can be said to be an appropriate method.

In order to ensure strength and accuracy of thickness, a plastic sheet is inevitably subjected to a pull process during manufacturing processes. Consequently, the plastic sheet is imparted with an irreversible thermal expansion/shrinkage characteristic. When the material is integrally affixed to the disk substrate, no particular problem is encountered in preserving the disk in a normal environment. There may arise a case where the dimension of a cover layer is changed by thermal shrinkage or moisture shrinkage resulting from the disk being preserved at high temperature and high humidity, thereby imparting "warpage" to the substrate with the cover affixed thereto and inducing a change in the amount of tilt to exert an adverse influence on a recording/reproduction characteristic.

A rigorous anti-reflection (AR) characteristic is set for the Blu-Ray disk [hence, the influence of the AR characteristic is greater than that on a CD or a DVD], and hence a nominal change in tilt induces deterioration of a characteristic.

SUMMARY OF THE INVENTION

The invention has been conceived in view of the foregoing circumstances and aims at providing an optical disk capable of preventing warpage of a disk substrate having a cover sheet, and a method for affixing a display sheet to the optical disk, thereby stabilizing read/write characteristics of the optical disk and preventing deterioration of appearance of the optical disk.

The present inventor has found that machining a plastic sheet into a circular shape and bonding the plastic sheet onto a side of the substrate as a image display layer, the side being opposite to a cover layer on the recording surface side of the substrate, in which the plastic sheet has the same characteristics as those of the cover layer, and thereby a balance between the image display layer and the cover layer can be achieved and that, as a result, a stable characteristic can be obtained even when the disk is preserved at high temperature and high humidity.

Moreover, the image display layer can be handled in the form of a sheet. After an image has been printed on the image display layer, the layer is affixed to a disk. Alternatively, after the image display layer has been affixed on a disk, an image is printed on the layer. Thus, an image can be printed on a disk by means of any of various techniques, thereby enabling enhancement of a commercial value.

FIGS. 14A and 14B are views for describing the structure of the Blu-Ray disk, wherein FIG. 14A is a plan view and FIG. 14B is a cross-sectional front view.

In the drawings, reference numeral 10 designates a display sheet; 3 designates a substrate; 5 designates a recording layer; 11 designates a cover sheet; and L3 designates a laser beam (blue wavelength).

The substrate 3 is polycarbonate having a thickness of 1.2 mm.

Since the recording surface is on the laser-incidence side of the substrate 3, recording operation is performed with a laser beam having a short wavelength. For this reason, the recording surface must be protected from adherence of dust particles. To this end, the cover sheet 11 is employed. The cover sheet 11 is made of PC (polycarbonate), TAC, or PET (polyethylene terephthalate).

In the meanwhile, in a case where contents recorded on the optical disk are digital images, a method for the user ascertaining the contents recorded on the optical disk is to load the optical disk into a player every time the user desires to ascertain the recorded contents. However, this is a laborious task.

Contents have hitherto been printed on a case into which the optical disk is to be stored. However, in such a case, the optical disk must always be housed in a specific corresponding case. This task per se is laborious. There is no guarantee that the optical disk will always be housed in a specific corresponding case; there has frequently arisen a case where the optical disk is housed in a case showing another recorded content. Therefore, ascertaining contents ultimately involves use of a player.

Another conceivable method is to affix a paper label on an optical disk and to enter contents of the optical disk on the label in characters, with a view toward easily ascertaining contents recorded on an optical disk. Ascertaining contents by reading characters is laborious and time-consuming and poses difficulty in using the disk for children or foreigners who do not understand characters.

As mentioned above, the user has hitherto encountered difficulty in readily ascertaining contents of an optical disk.

According to the optical disk of the invention, no warpage arises in a disk even when the substrate is stored at high temperature, as a result of a sheet having the same physical characteristics as those of the cover sheet being affixed to the other side of the substrate.

The sheet is made printable as a display sheet, and at least one or a required number of representative digital images showing recorded contents are printed, thereby enabling the user to ascertain contents of the optical disk at a glance. Thus, there can be prevented occurrence of inconvenience even when the optical disk is housed in an arbitrary case. Therefore, after a display sheet has been bonded to a disk substrate, an image is printed on the sheet. Alternatively, after an image has been printed on a display sheet, the sheet is bonded to a disk substrate. As a result, a coincidence always arises between the optical disk and the recorded contents. Moreover, as a result of recording of an image, there is obtained an optical disk which is easily understandable for children or persons who cannot read characters.

In order to achieve the object, according to a first aspect of the invention, there is provided an optical disk comprising: a disk substrate having a recording layer formed on one surface of a substrate and a cover sheet applied over the recording layer; and a display sheet which has substantially the same physical characteristic as that of the cover sheet and is affixed to a surface of the disk substrate opposite to a surface thereof covered with the cover sheet.

According to the optical disk, a display sheet having substantially the same physical characteristic as that of a cover sheet is affixed to a surface of a disk substrate opposite a surface thereof coated with the cover sheet, wherein the cover sheet is applied to a recording layer on one surface of a substrate. Hence, substantially the same physical characteristic is achieved on the front and back surfaces of the substrate. The forces exerted on the substrate from the sheet become equal to each other by virtue of the structural strength of the front and back of the substrate and a temperature change, thereby preventing occurrence of a warpage, which would otherwise tend to arise in the disk substrate. As a result, the read/write characteristics of the optical disk become stable, and good appearance of the optical disk is ensured simultaneously.

According to a second aspect of the invention, there is provided an optical disk set forth in the first aspect of the invention, wherein the display sheet and the cover sheet substantially coincide with each other in terms of the direction of heat contraction and a heat contraction rate.

According to the optical disk, the cover sheet and the display sheet are substantially identical with each other in terms of direction of heat contraction and a thermal contraction rate. Accordingly, even in the event of a large heat history, the cover sheet and the display sheet are identical with each other in the direction of heat contraction. Hence, the forces acting on the substrate cancel each other, thereby preventing warpage of the disk substrate.

According to a third aspect of the invention, there is provided an optical disk as set forth in the first or second aspect of the invention, wherein the thickness of the display sheet falls within a range of 0.05 to 0.3 mm.

According to the optical disk, the thickness of the display sheet can be made equal to that of the cover layer of an optical disk which enables mass-storage recording (by means of a so-called 0.1 mm cover layer system). As a result, forces caused by the cover layer can be canceled by each other on the opposite surface of the substrate.

According to a fourth aspect of the invention, there is provided an optical disk comprising: a disk substrate having a recording layer formed on one surface of a substrate and a cover sheet applied over the recording layer; and a display sheet which has substantially the same physical characteristic as that of the cover sheet and an adhesive surface affixed to peeling paper and is an accessory separate from the disk substrate.

In relation to this optical disk, a cover sheet having substantially the same physical characteristic as that of the cover sheet is provided as an accessory separate from the disk substrate, thereby enhancing the degree of freedom of the user in adopting an image formation method for use with a display sheet.

According to a fifth aspect of the invention, there is provided an optical disk as set forth in any of the first to fourth aspects of the invention, wherein a mark indicating the direction of heat contraction of the cover sheet is provided on the cover sheet, and a mark indicating the direction of heat contraction of the display sheet is provided on the display sheet.

In this optical disk, the cover sheet provided with a mark is applied to a substrate beforehand, and the display sheet is affixed to the substrate in alignment with the mark of the cover sheet. As a result, a match exists between the cover sheet and the display sheet in terms of direction of heat contraction. Further, the mark of the cover sheet is provided directly on the cover sheet. Hence, an error becomes unlikely to arise between the direction of heat contraction of the cover sheet and the mark.

According to a sixth aspect of the invention, there is provided an optical disk as set forth in any of the first to fourth aspects of the invention, wherein a mark indicating the direction of heat contraction of the cover sheet is provided on the substrate, and a mark indicating the direction of heat contraction of the display sheet is provided on the display sheet.

In this optical disk, the cover sheet is applied to the substrate such that the mark provided on the substrate coincides with the direction of heat contraction. The display sheet is also affixed to the substrate while the mark provided on the substrate remains coincident with the mark. If the mark is provided on the surface of the substrate on which the display sheet is to be affixed, the necessity for viewing the mark of the cover sheet from the opposite surface through the substrate is obviated. The visibility achieved when the mark of the display sheet is aligned becomes better.

According to a seventh aspect of the invention, there is provided an optical disk as set forth in any of the fifth to sixth aspects of the invention, wherein the mark corresponds to any one of a notch, a hole, and a slit section.

In this optical disk, if the mark is formed from a notch, positioning of the mark can be performed with the aid of the sense of touch as well as with a visual check. Even when the mark is a hole, positioning of the mark can also be performed with the aid of the sense of touch as well as with a visual check, thereby enabling highly accurate positioning. If the mark is a slit section, highly accurate positioning becomes easy to achieve, and a loss is unlikely to arise in the display sheet. Hence, occurrence of a drop in the strength of the display sheet is prevented.

According to a eight aspect of the invention, there is provided an optical disk as set forth in the first aspect of the invention, wherein the display sheet is effectively formed from a two-layer structure; that is, upper and lower layers; the lower layer is a base layer including a fluorescent substance, and the upper layer is a image print layer provided on the base layer so as to cover the same.

By means of such a configuration, a base layer including a fluorescent color former is provided on the substrate, and the image print layer is provided thereon. Hence, a solar light beam having entered the fluorescent color former by way of a bright image portion of the image print layer causes the fluorescent color formation layer to illuminate, thereby radiating the image print layer from the back thereof. The image recorded on the image print layer assumes vibrant colors.

According to a ninth aspect of the invention, there is provided an optical disk as set forth in the eighth aspect of the invention, wherein the base layer is formed on the substrate in an isotropically uniform manner; the image print layer is formed from a plurality of blocks; and a space between the blocks is taken as a non-print section.

In the case described in the eighth aspect of the invention, when the entire image is dark; i.e., close to a shadow, the solar light beam may fail to reach the fluorescent color former. There may arise a case where the specially-provided fluorescent color former fails to exhibit the capability thereof. By means of the foregoing configuration, a non-print section which has light permeability and is not subjected to printing or an unprintable section on which nothing can be printed is provided on the image print layer. The solar light beam reaches a base layer by way of such a transparent non-print section, thereby exciting the fluorescent substance to produce reflected light. Hence, an image can be seen brightly regardless of a printed image being dark.

According to a tenth aspect of the invention, there is provided an optical disk as set forth in the eighth or ninth aspect of the invention, wherein one print image is formed from a plurality of blocks on the image print layer, and a space between the blocks is taken as a non-print section having transparency to light.

By means of the foregoing configuration, one print image is formed from a plurality of blocks. Further, a non-print section which has light permeability and is not subjected to printing and an unprintable section on which nothing can be printed are provided on the image print layer. Hence, superior appearance of multi-window type is achieved. Since the solar light beam reaches the base layer by way of the transparent non-print section, the image can be seen in vivid colors.

According to a eleventh aspect of the invention, there is provided an optical disk as set forth in the eighth or ninth aspect of the invention, wherein different print images are formed into thumbnails in each block on the image print layer, and a space between said blocks is taken as a non-print section.

By means of such a configuration, a print image is formed in a thumbnail, thereby enabling easy and accurate ascertainment of contents. Further, a solar light beam reaches a base layer by way of a transparent non-print section having light permeability. Hence, the image can be seen in vivid colors.

According to a twelfth aspect of the invention, there is provided an optical disk as set forth in any of ninth to eleventh aspects of the invention, wherein the non-print section is formed from a grid pattern, a radial pattern, a concentric pattern, or a combination thereof.

By means of such a configuration, the non-print section assumes a geometrical pattern, and hence superior appearance is achieved. Further, a solar light beam reaches the base layer by way of a transparent non-print section, and hence the image can be seen in vivid colors.

According to the invention, there is provided a thin plastic sheet to be affixed on a disk substrate, comprising: a printable area and an unprintable area are provided on the front or backs side of the sheet.

If such a thin plastic sheet to be affixed on a recording disk is used, a print section and a non-print section are automatically formed by means of only printing an image on the sheet, thereby offering convenience for the user.

According to the invention, there is provide a method for affixing a display sheet to a disk substrate, the method including: affixing a display sheet on a opposite surface of the disk substrate, which has a recording layer formed on a surface of a substrate and a cover sheet applied over the recording layer, the opposite surface being opposite to the surface of the disk substrate covered with the cover sheet, wherein a mark, which is provided on at least either the cover sheet or the substrate and indicates a direction of heat contraction of the cover sheet, is caused to coincide with a mark, which is provided on the display sheet and indicates a direction of heat contraction of the display sheet, thus affixing the display sheet on the opposite surface of the disk substrate.

According to the method for affixing a display sheet to a disk substrate of the invention, even a user who does not have any special equipment or technique can align the direction of heat contraction of the cover sheet with that of the display sheet by means of merely aligning the marks with each other. The forces acting on both the front and back of the substrate due to heat contraction can be easily canceled by each other. Before being affixed to the substrate, the display sheet is a single sheet separate from the substrate. As compared with an optical disk having the display sheet previously affixed to the substrate, the optical disk of the invention enables application of various image formation methods for the display sheet, thus enhancing the degree of freedom of application of the image formation method to the display sheet.

DETAILED DESCRIPTION OF THE INVENTION

A preferred mode of embodiment of an optical disk according to the invention and a method for affixing a display sheet to the optical disk will be described in detail herein below by reference the drawings.

Figure 1:
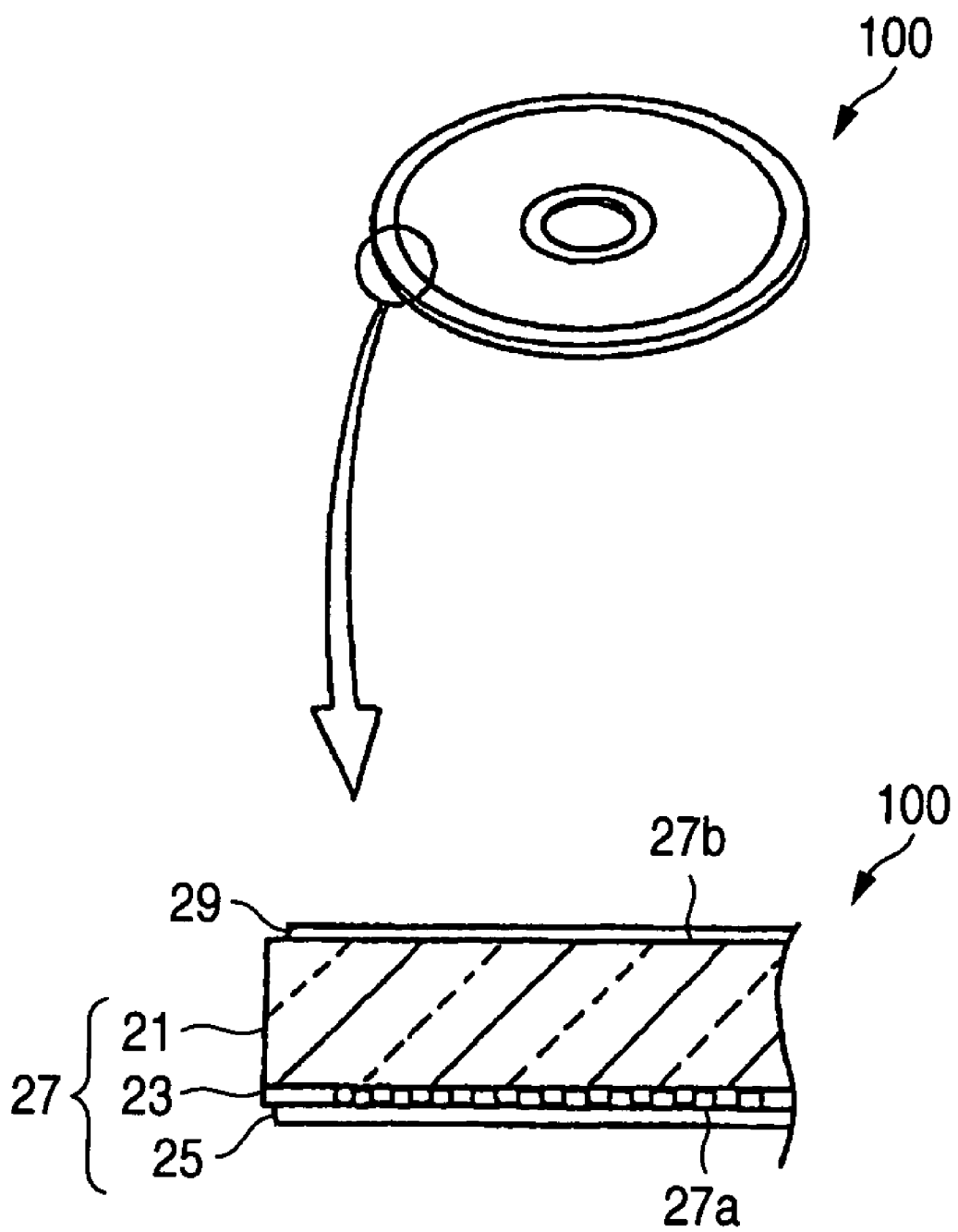
FIG. 1 is a descriptive view showing the appearance of an optical disk according to a first embodiment of the invention and a fragmentary enlarged cross-sectional view of the optical disk.
Figure 2:
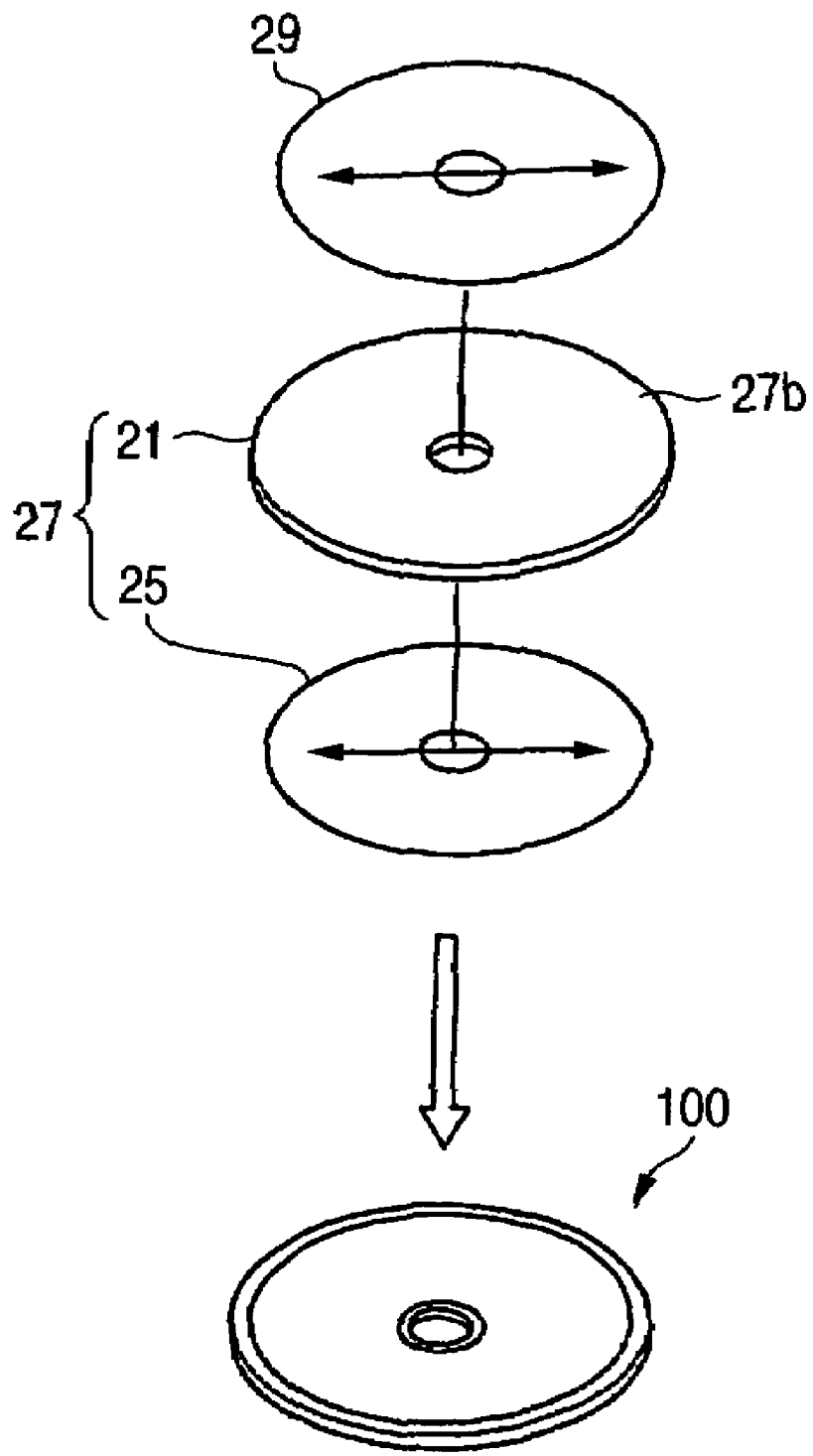
FIG. 2 is a descriptive view showing an exploded perspective view and an external appearance of the optical disk shown in FIG. 1.
Figure 3:
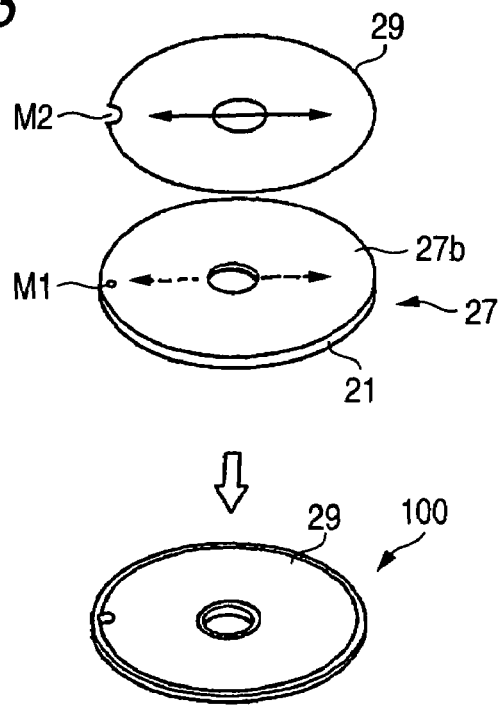
FIG. 3 is a descriptive view showing an exploded perspective view and an external perspective view of the disk substrate provided with marks and a display sheet.
Figure 4A:
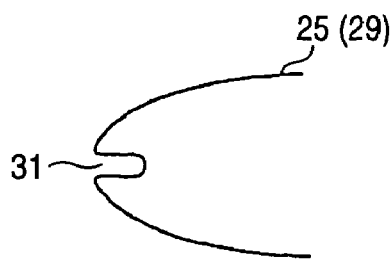
FIGS. 4A to 4C are descriptive views illustrating kinds of marks.
Figure 4B:
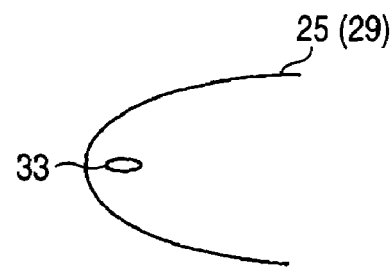
Figure 4C:
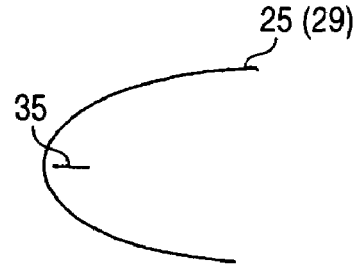
Figure 5:
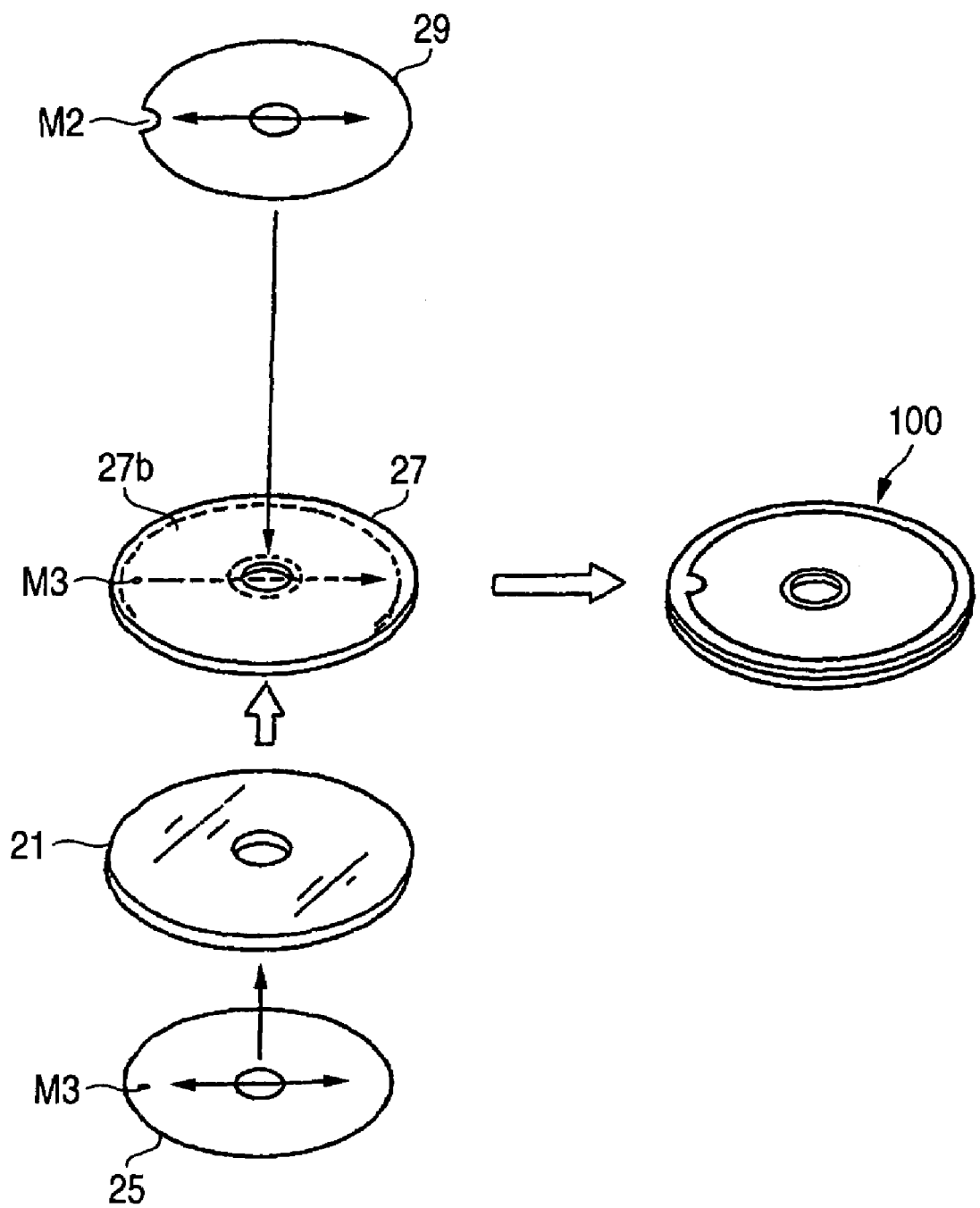
FIG. 5 is a descriptive view representing processes for affixing a display sheet to the substrate.

FIG. 1 is a descriptive view showing the appearance of an optical disk according to a first embodiment of the invention and a fragmentary enlarged cross-sectional view of the optical disk. FIG. 2 is a descriptive view showing an exploded perspective view and appearance of the optical disk shown in FIG. 1. FIG. 3 is a descriptive view showing an exploded perspective view and an external perspective view of the disk substrate provided with marks and a display sheet. FIGS. 4A to 4C are descriptive views illustrating kinds of marks. FIG. 5 is a descriptive view representing processes for affixing a display sheet to the substrate.

In an optical disk 100 according to a first embodiment of the invention, a recording layer 23 is formed on one side of a substrate 21. A cover sheet 25 is integrally provided on the recording layer 23, thus constituting a disk substrate 27. A display sheet 29 is affixed to a surface 27b of the disk substrate 27 opposite to a surface 27a on which the cover sheet 25 is integrally provided. In the embodiment, the substrate 21 and the cover sheet 25 are transparent, and the display sheet 29 may be transparent or opaque. TAC having a high optical transmissivity is preferably used for the cover sheet 25 and the display sheet 29. A recording layer formed from an organic or inorganic material is preferably used for the recording layer 23.

The cover sheet 25 and the display sheet 29 have substantially identical physical characteristics. Representative physical characteristics include the direction of heat contraction and a heat contraction rate. Specifically, in the optical disk 100 of the embodiment, the cover sheet 25 and the display sheet 29 are substantially identical with each other in terms of direction of heat contraction (i.e., the directions indicated by the arrows provided in the sheets shown in FIG. 2) and a thermal contraction rate. Accordingly, even in the event of a large heat history, the cover sheet 25 and the display sheet 29 are identical with each other in the direction of heat contraction. Hence, the forces acting on the substrate 21 cancel each other, thereby preventing warpage of the disk substrate 27.

The thickness of the display sheet 29 is set within a range of 0.05 mm to 0.3 mm. As a result of the thickness of the display sheet 29 falling within the range, the thickness of the display sheet 29 can contribute to rendering uniform the thickness of the cover layer (i.e., the cover sheet 25 of the embodiment) of the optical disk for which a violet laser light source enabling mass-storage recording is to be used. The cover sheet 25 possesses a superior light transmissivity with respect to the wavelength of recording/playback light. The force stemming from the display sheet can be canceled by the opposite surface of the substrate 21.

The cover sheet 25 is affixed to the substrate 21 when production of the optical disk 100 is finished. As shown in FIG. 3, the display sheet 29 may be provided separately from the disk substrate 27. Specifically, the optical disk 100 may also be configured by comprising the disk substrate 27 having the recording layer 23 formed on one surface of the substrate 21 and the cover sheet 25 applied over the recording layer 23; and the display sheet 29 which has substantially the same physical characteristic as that of the cover sheet 25 and an adhesive surface affixed to unillustrated peeling paper and is available as an accessory separate from the disk substrate 27.

In this case, after having been purchased, the display sheet 29 is affixed to the disk substrate 27 by the user. Therefore, a mark M1 indicating the direction of heat contraction of the cover sheet 25 is provided on the cover sheet 25, and a mark M2 indicating the direction of heat contraction of the display sheet 29 is provided on the display sheet 29.

The mark M1 of the cover sheet 25 becomes visible from the opposite surface 27b of the disk substrate 27 as a result of the cover sheet 25 being affixed to the transparent substrate 21. The display sheet 29 is affixed to the disk substrate 27 while being aligned with the mark M1. When the mark M1 is provided on the display sheet of the substrate 21 in a corresponding manner, the substrate 21 does not need to be transparent.

In relation to the optical disk 100 provided with the display sheet 29 as an accessory separate from the disk substrate 27, the degree of freedom of an image formation method to be applied to the display sheet 29 of the user is enhanced. Specifically, an image formation method, such as insertion of only the display sheet 29 into a printer, becomes available.

In the optical disk 100 in which the mark M1 is provided on the cover sheet 25 and the mark M2 is provided on the display sheet 29, the cover sheet 25 provided with the mark M1 is applied over the substrate 21 beforehand, and the display sheet 29 is affixed to the substrate 21 in alignment with the mark M1 of the cover sheet 25. As a result, the cover sheet 25 coincides with the display sheet 29 in the direction of heat contraction. Further, the mark M1 of the cover sheet 25 is provided directly on the cover sheet 25, and hence an error becomes unlikely to arise between the direction of heat contraction of the cover sheet 25 and the mark M1.

The mark may be provided on the substrate 21. In this case, the cover sheet 25 is applied to the substrate 21 such that the mark (not shown) provided on the substrate 21 coincides with the direction of heat contraction. The display sheet 29 is also affixed to the substrate 21 while the mark provided on the substrate 21 remains coincident with the mark M2. If the mark is provided on the surface of the substrate 21 on which the display sheet 29 is to be affixed, the necessity for viewing the mark M1 of the cover sheet 25 from the opposite surface 27b through the substrate 21 is obviated. The visibility achieved when the mark of the display sheet 29 is aligned becomes better.

As shown in FIG. 4, the marks M1, M2 can be embodied as any one of a notch 31, a hole 33, a slit section 35, and a dot (a print formed in a black dot pattern) omitted from the drawings, or as a combination thereof. In this case, if the mark M2 is formed from the notch 31, positioning of the mark M2 can be performed with the aid of the sense of touch as well as with a visual check. Even when the mark M2 is the hole 33, positioning of the mark M2 can also be performed with the aid of the sense of touch as well as with a visual check, thereby enabling highly accurate positioning. If the mark M2 is the slit section 35, highly-accurate positioning becomes easy to achieve, and a loss does not arise in the display sheet 29. Hence, occurrence of a drop in the strength of the display sheet 29 is prevented.

There will now be described a method for affixing the display sheet 29 to the optical disk 100 when the cover sheet 25 and the display sheet 29 are provided with the marks M1, M2, respectively.

As shown in FIG. 5, the substrate 21 is not provided with any marks, and the cover sheet 25 is provided with a dot-shaped mark M3. The mark M3 is provided on a line extending in the direction of a diameter, the line indicating the direction of heat contraction of the cover sheet 25. Consequently, the disk substrate 27 to which the cover sheet 25 is applied enables viewing of the mark M3 from the opposite surface 27b.

The mark M2 formed from the notch 31 cut toward the inside with reference to the radial direction is provided in the outer periphery of the display sheet 29. The mark M2 is also provided on the line extending in the direction of the diameter, the line indicating the direction of heat contraction of the display sheet 29. The cover sheet 25 is applied to the substrate 21 beforehand, thereby constituting the disk substrate 27.

When the display sheet 29 is affixed to the disk substrate 27, the mark M3 of the cover sheet 25 adhering to the substrate 21 is viewed from the opposite surface 27b of the disk substrate 27. The display sheet 29 is affixed to the opposite surface 27b of the disk substrate 27 while the mark M2 of the display sheet 29 fits into the notch 31. As a result, there is obtained the optical disk 100, wherein the cover sheet 25 and the display sheet 29, being provided on the respective surfaces of the disk substrate 27, are aligned with each other in terms of direction of heat contraction.

According to the optical disk 100, the display sheet 29 having substantially the same physical characteristic as that of the cover sheet 25 is affixed to the surface 27b of the disk substrate 27 opposite to a surface thereof coated with the cover sheet 25, wherein the cover sheet 25 is applied on the recording layer 23 provided on one surface of the substrate 27. Substantially the same physical characteristic is achieved on the front and back surfaces of the substrate 27. The forces exerted on the substrate 21 from the sheets become equal to each other by virtue of the structural strength of the front and back of the substrate and a temperature change, thereby preventing occurrence of a warpage, which would otherwise tend to arise in the disk substrate 27. As a result, the read/write characteristics of the optical disk 100 become stable, and good appearance of the optical disk 100 is ensured simultaneously.

According to the method for applying a display sheet to the disk substrate, even a user can align the direction of heat contraction of the cover sheet 25 with that of the display sheet 29, by means of merely aligning the marks M2, M3 with each other. The forces acting on both the front and back of the substrate due to heat contraction can be easily canceled by each other. Before being affixed to the substrate 21, the display sheet 29 is a single sheet separate from the substrate 21. As compared with an optical disk having the display sheet 29 previously affixed to the substrate 21, the optical disk of the invention enables application of various image formation methods for the display sheet 29, thus enhancing the degree of freedom of application of the image formation method to the display sheet 29.

Figure 6:
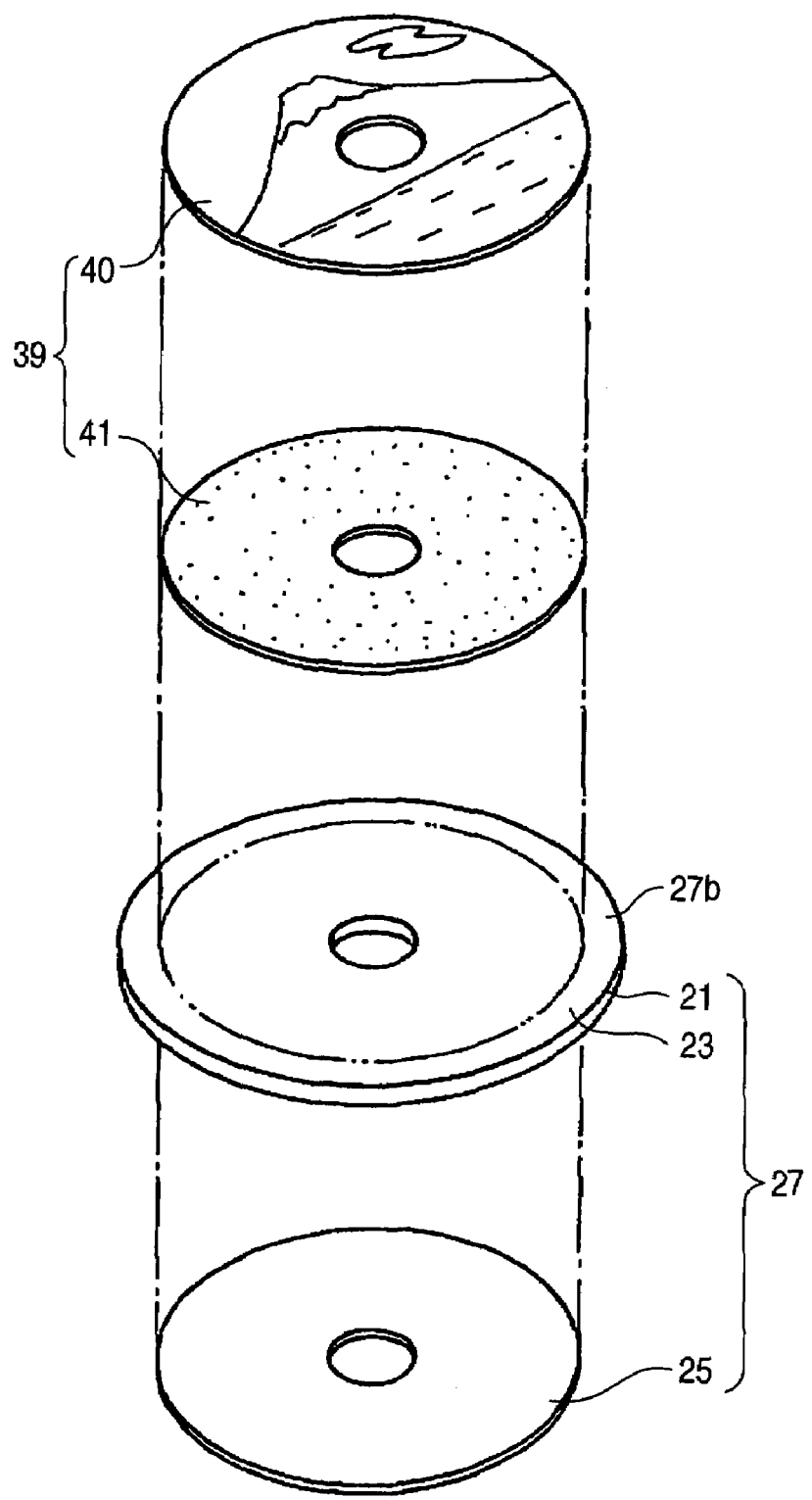
FIG. 6 is an exploded perspective view of an optical disk according to a second embodiment of the invention.

FIG. 6 is an exploded perspective view of an optical disk according to a second embodiment of the invention.

In the drawing, reference numeral 39 designates a display sheet; 21 designates a substrate; 25 designates a cover sheet; and 27 designates a disk substrate. A recording layer 23 is formed on a substrate 21, and a cover sheet 25 is integrally provided on the recording layer 23, thus constituting a disk substrate 27. The display sheet 39 is bonded to a surface 27b of the disk substrate 27, the surface 27b being opposite to a surface of the disk substrate 27 on which the cover sheet 25 is integrally provided. The present embodiment is characterized by formation of the display sheet 39 from an image print layer 40 and a fluorescent base layer 41.

The display sheet 39 is formed from a material having substantially the same physical characteristic as that of the cover sheet 25. Therefore, the display sheet 39 is formed from polycarbonate, TAC, or polyethylene terephthalate.

The fluorescent color former of the fluorescent base layer 41 can be embodied by paint containing zinc oxide or paint containing phosphor.

Figure 8A:
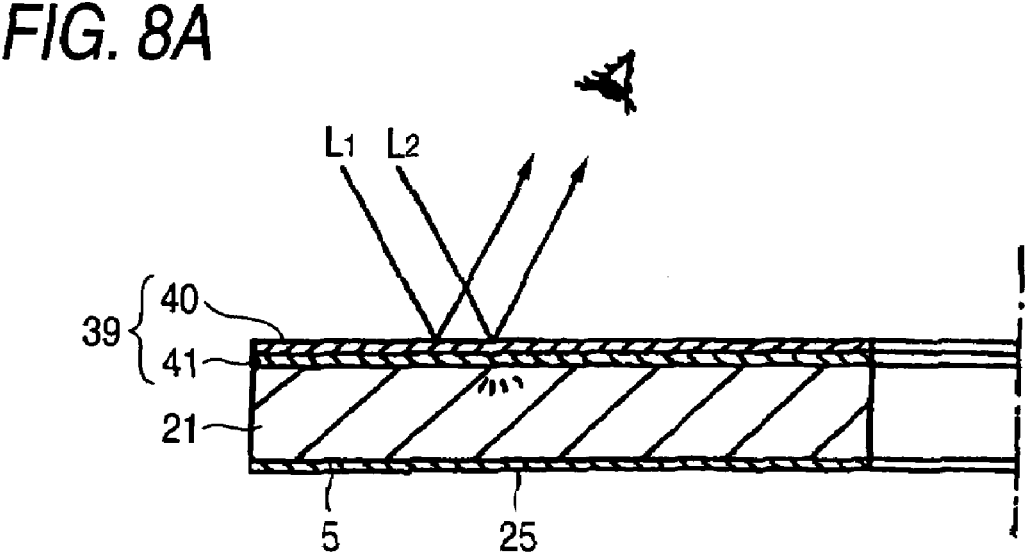
FIG. 8A is a longitudinal cross-sectional view of the optical disk shown in FIG. 6.

FIG. 8A is a longitudinal cross-sectional view of the optical disk shown in FIG. 6. In FIG. 8A, reference numeral 39 designates a display sheet formed from an image print layer 40 and a fluorescent base layer 41. Reference numeral 21 designates a substrate, and 25 designates a cover sheet. When solar light beams L1, L2 have arrived at the image print layer 40, the light beams are reflected from an image portion of the image print layer 40, thereby arriving at the viewer's eyes. In addition, a portion of the solar light beam L2 transmits through an unprinted portion of the image and a printed portion having a bright, pale color close to transparence, both of which are on the image print layer 40, to thereby arrive at the fluorescent base layer 41. UV rays of the solar light beam L2 excite a fluorescent color former, causing it to illuminate. Color-forming light radiates the image portion from its back. The user can see the image in vivid colors by means of a backlight effect.

As mentioned above, according to the optical disk of the second embodiment, the solar light beam having entered the fluorescent color former from a bright portion of the image on the display sheet illuminates, thereby radiating the display sheet from the back thereof. Therefore, the image recorded on the display sheet assumes a bright color.

Figure 7:
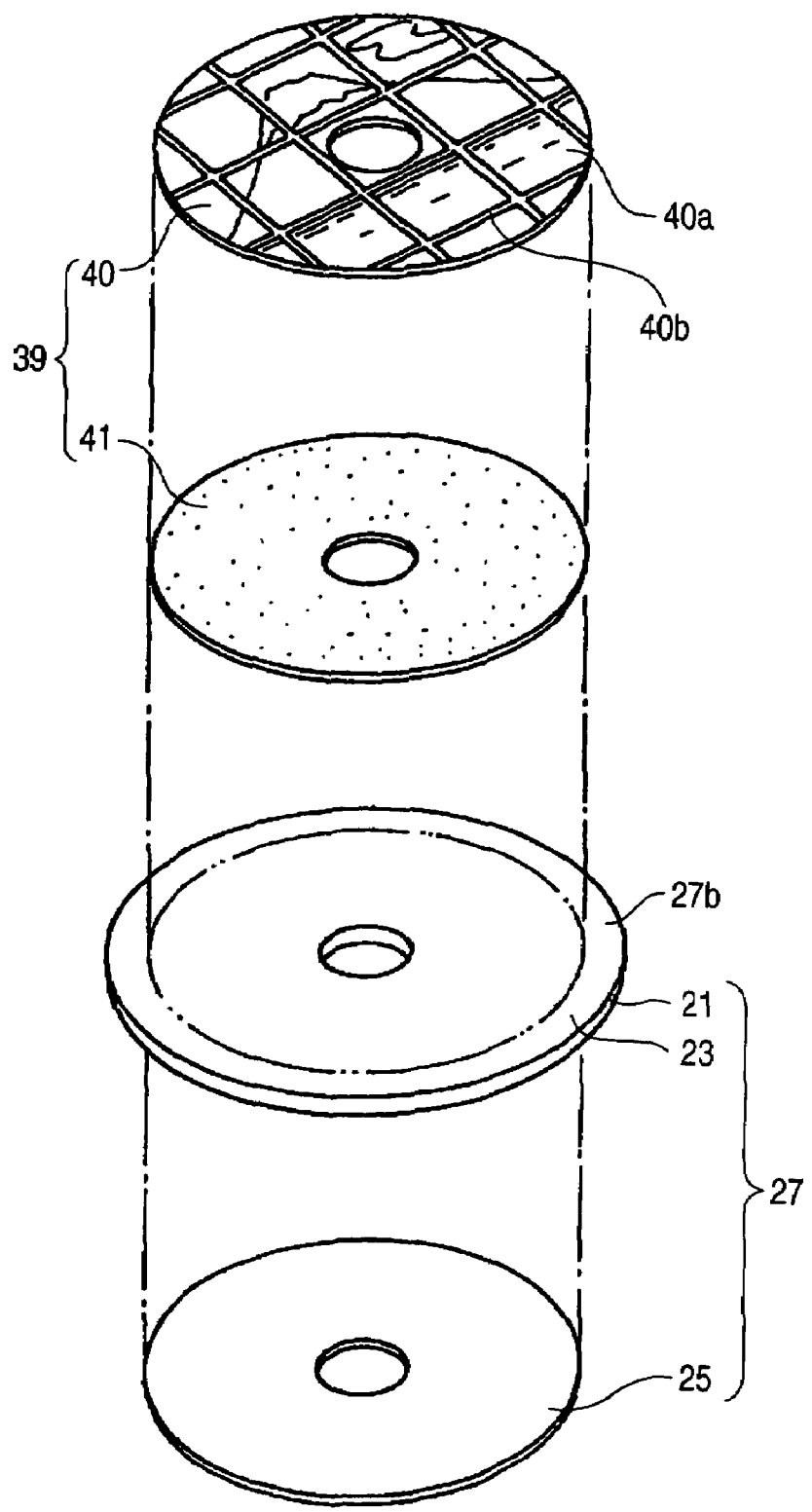
FIG. 7 is an exploded perspective view of an optical disk according to a third embodiment of the invention.

FIG. 7 is an exploded perspective view of an optical disk according to a third embodiment of the invention.

The third embodiment is characterized in that the image print layer 40 of the display sheet 39 is divided into a print section 40a and a non-print section 40b.

The non-print section 40b may be a section (i.e., a non-print section) which is not actively subjected to printing during printing operation, or a section (i.e., an unprintable section) on which nothing can be printed during printing operation.

In order to render a section unprintable, the section is coated with a hydrophilic substance.

As a result, since a solar light beam inevitably passes through the non-print section 40b, and the solar light beam (i.e., UV rays) excites a fluorescent color former of the fluorescent base layer 41 to illuminate, thereby radiating the image print layer 40 from the back thereof. Hence, the image can be seen brightly.

Figure 8B:
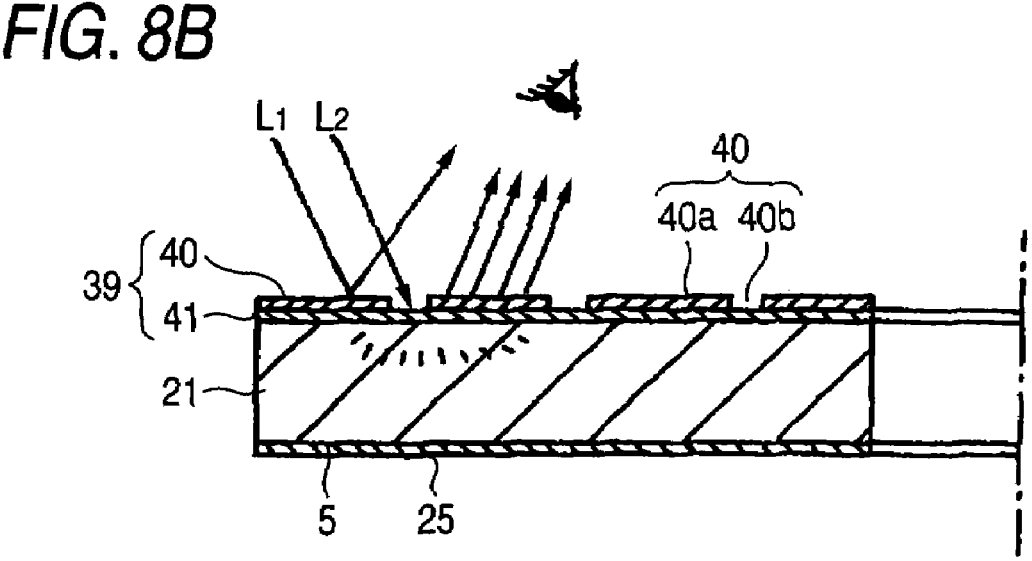
FIG. 8B is a longitudinal cross-sectional view of the optical disk shown in FIG. 7.

FIG. 8B shows a longitudinal cross-sectional view of the optical disk shown in FIG. 7. A commonality between FIGS. 8A and 8B lies in that reference numeral 39 designates a display sheet and in that the display sheet 39 is formed from the image print layer 40 and the fluorescent base layer 41. Reference numeral 21 designates a substrate; and 25 designates a cover sheet.

In the case shown in FIG. 8A, when the entire image happens to be close to a shadow, vivid color scan not be obtained. However, if the configuration shown in FIG. 8B is adopted, even when the entire image happens to be close to a shadow, vivid colors are inevitably obtained.

Figure 9A:
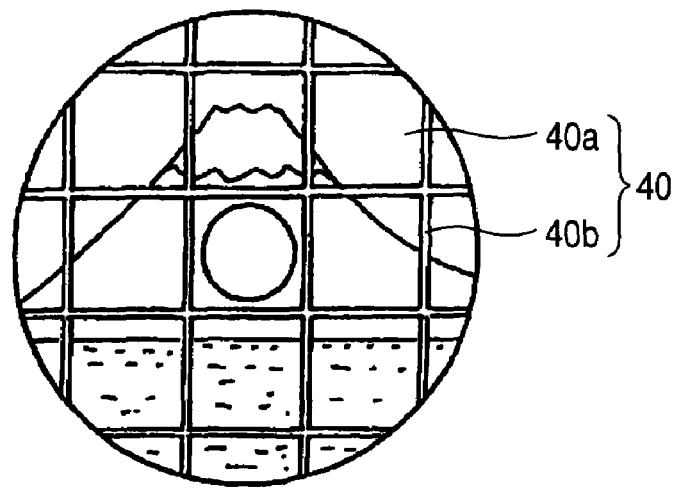
FIGS. 9A to 9C show various patterns assumed by a non-print section on an image print layer provided on a display sheet of an optical disk according to a fourth embodiment of the invention.
Figure 9B:
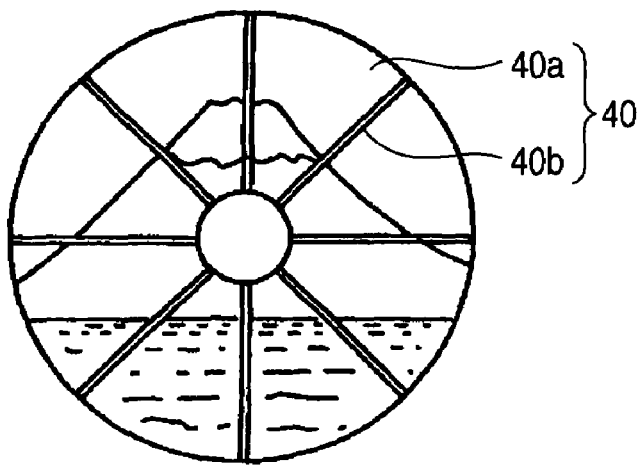
Figure 9C:
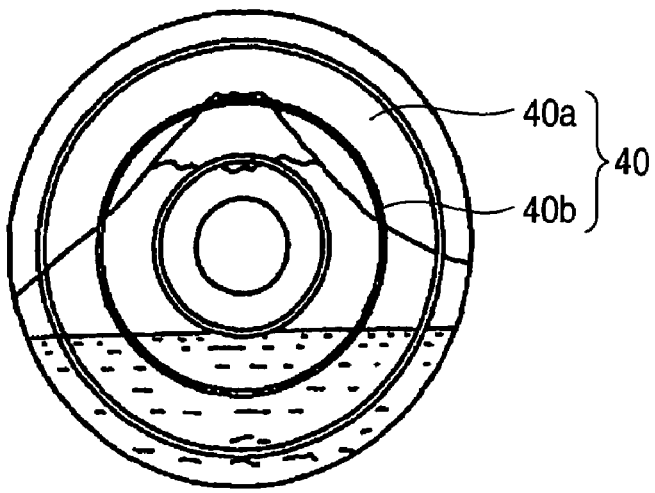
Figure 10:
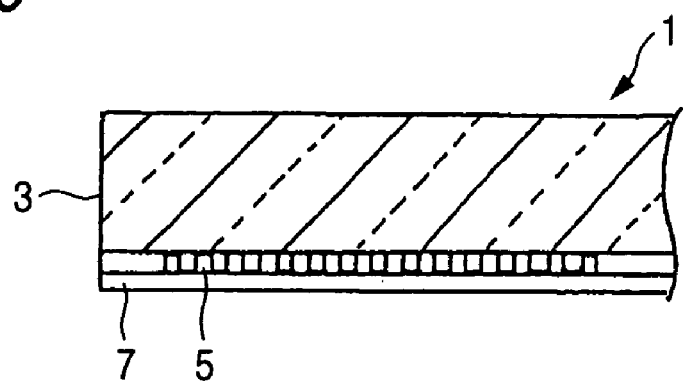
FIG. 10 is a cross-sectional view of a related-art optical disk.
Figure 11:
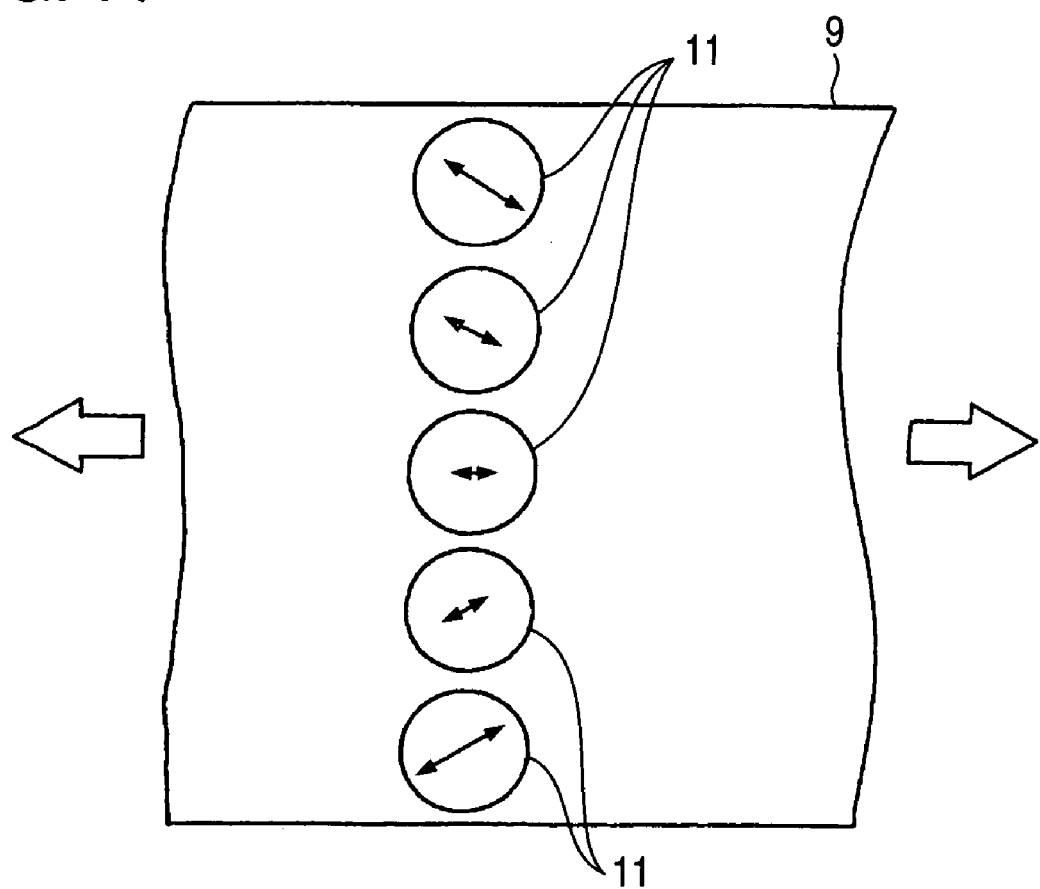
FIG. 11 is a descriptive view showing a situation out of which material of a cover sheet is taken.
Figure 12:
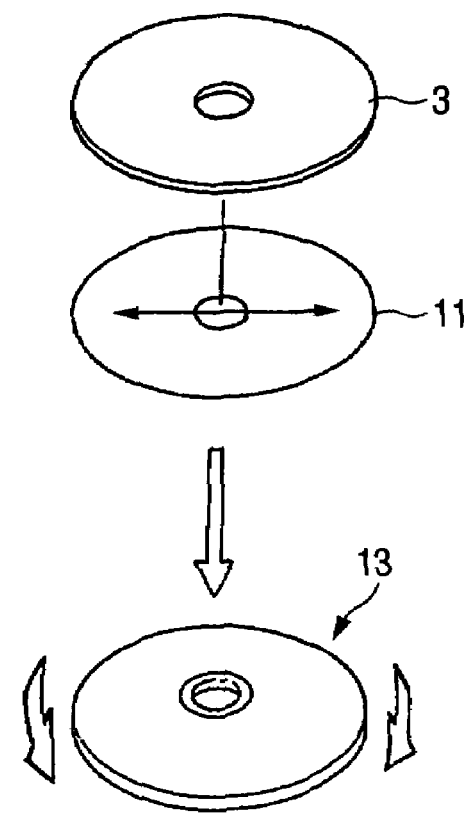
FIG. 12 is a descriptive view showing an exploded perspective view and an external appearance of a related-art optical disk covered with a cover sheet.
Figure 13:
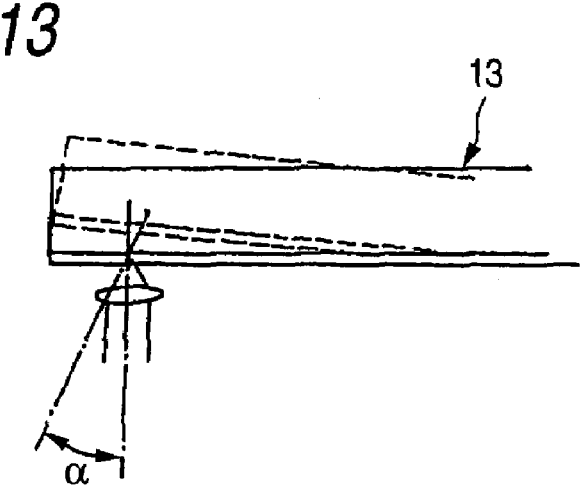
FIG. 13 is a descriptive view showing a situation of a tilt change due to warpage of the related-art optical disk.
Figure 14A:
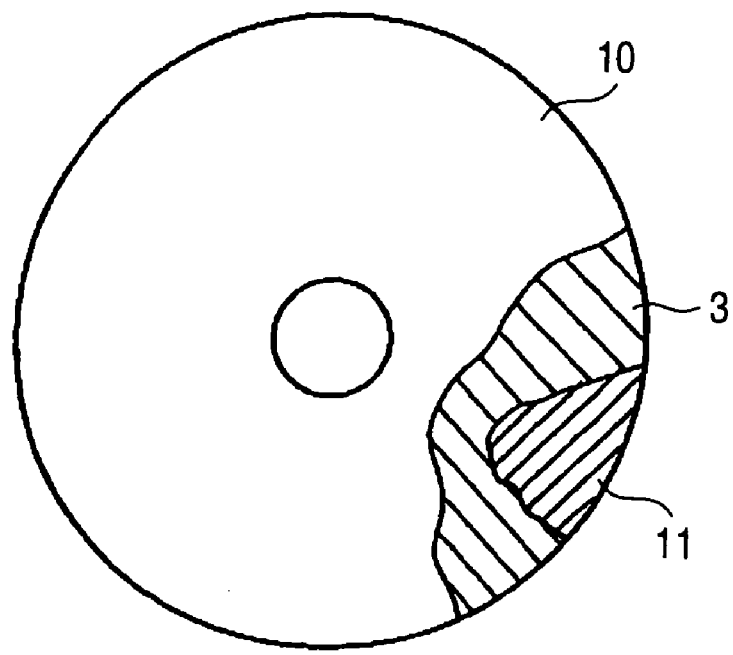
FIG. 14A is a plan view for describing the structure of a Blu-Ray disk.
Figure 14B:
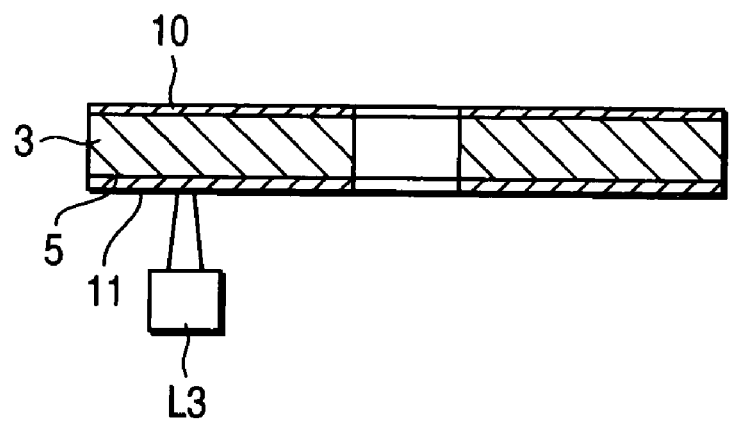
FIG. 14B is a front cross-sectional view for describing the structure of a Blu-Ray disk.

FIGS. 9A to 9C show various patterns assumed by the non-print section 40b of the image print layer 40 provided on the display sheet 39 according to a fourth embodiment of the invention. Reference numeral 40 designates an image print layer; 40a designates a printable section; and 40b designates a non-print section. In FIG. 9A, the non-print section 40b assumes a grid pattern. In FIG. 9B, the non-print section 40b assumes a radial pattern. In FIG. 9C, the non-print section 40b assumes a concentric pattern.

As a result of adoption of any one of these patterns, the print section 40a corresponding to the image becomes vibrant, and also the entire image provides an impression of a multi-pane window or jigsaw, thereby improving an aesthetic value.

The widths and number of lattices, radial lines, and concentric circles may be changed by design, as required.

Any of the non-print sections shown in FIGS. 9A to 9C may be used solely. However, as a matter of course, they may also be used in combination.

The foregoing has described a Blu-Ray disk as an example. However, the present invention is not limited to this disk. Needless to say, if the present invention is applied to another recording disk (CD, DVD) in the same manner, an image printed on a thin plastic sheet can be viewed in vivid colors.

As has been described in detail, according to an optical disk of the invention, a display sheet having substantially the same physical characteristic as that of a cover sheet is affixed to a surface of a disk substrate opposite a surface thereof coated with a cover sheet, wherein the cover sheet is applied to a recording layer on one surface of a substrate. Hence, Substantially the same physical characteristic is achieved on the front and back surfaces of the substrate. The forces exerted on the substrate from the sheet become equal to each other by virtue of the structural strength of the front and back of the substrate and a temperature change, thereby preventing occurrence of a warpage, which would otherwise tend to arise in the disk substrate. As a result, the read/write characteristics of the optical disk become stable, and good appearance of the optical disk is ensured simultaneously.

According to a method for affixing a display sheet to an optical disk of the invention, a mark—which is provided on a display sheet and indicates the direction of heat contraction—is caused to coincide with a mark which is provided on at least either a cover sheet or a substrate and indicates the direction of heat contraction, and the display sheet is affixed to the opposite surface of the disk substrate. Even a user can align the direction of heat contraction of the cover sheet with that of the display sheet by means of merely aligning the marks with each other. The forces acting on both the front and back of the substrate stemming from heat contraction can be easily canceled by each other. Before being affixed to the substrate, the display sheet is a single sheet separate from the substrate. As compared with an optical disk having the display sheet previously affixed to the substrate, the optical disk of the invention enables application of various image formation methods for the display sheet, thus enhancing the degree of freedom of application of the image formation method to the display sheet and improving the commercial value of the optical disk.

As mentioned above, the optical disk according to the invention is suitable for an information recording disk for recording a large volume of information (including image and music information) such as a Blu-Ray disk which records data through use of UV rays of short wavelength and requires a large-diameter anti-reflection characteristic. The display sheet can be constituted such that the image print layer is placed on a fluorescent color formation layer. Hence, illumination of the fluorescent color formation layer improves identification of an upper print surface, thereby improving appearance.

As a result of provision of a non-print section, a light beam which excites fluorescence can readily reach a base fluorescent layer, thereby ensuring ease of identification of the image print layer (i.e., appearance).

The image print layer is constituted of a plurality of blocks of several shapes. Hence, diversification of a design of a single-piece image or display of a thumbnail can be readily effected while appearance is ensured.

The entire disclosure of each and every foreign patent application from which the benefit of foreign priority has been claimed in the present application is incorporated herein by reference, as if fully set forth.

What is claimed is:

1. An optical disk comprising:
a disk substrate having a recording layer formed on one surface of a substrate and a cover sheet applied over the recording layer; and
a display sheet which has substantially the same physical characteristic as that of the cover sheet and is affixed to a surface of the disk substrate opposite to a surface thereof covered with the cover sheet,
wherein the display sheet and the cover sheet substantially coincide with each other in terms of the direction of heat contraction and a heat contraction rate.

2. The optical disk according to claim 1, wherein the thickness of the display sheet falls within a range of 0.05 to 0.3 mm.

3. The optical disk according to claim 1, wherein a mark indicating the direction of heat contraction of the cover sheet is provided on the cover sheet, and a mark indicating the direction of heat contraction of the display sheet is provided on the display sheet.

4. An optical disk comprising:
a disk substrate having a recording layer formed on one surface of a substrate and a cover sheet applied over the recording layer; and
a display sheet which has substantially the same physical characteristic as that of the cover sheet and an adhesive surface affixed to peeling paper and is an accessory separate from the disk substrate,
wherein a mark indicating the direction of heat contraction of the cover sheet is provided on the cover sheet, and a mark indicating the direction of heat contraction of the display sheet is provided on the display sheet.

5. An optical disk comprising:
a disk substrate having a recording layer formed on one surface of a substrate and a cover sheet applied over the recording layer; and
a display sheet which has substantially the same physical characteristic as that of the cover sheet and is affixed to a surface of the disk substrate opposite to a surface thereof covered with the cover sheet,
wherein a mark indicating the direction of heat contraction of the cover sheet is provided on the substrate, and a mark indicating the direction of heat contraction of the display sheet is provided on the display sheet.

6. The optical disk according to claim 3, wherein the mark corresponds to any one of a notch, a hole, and a slit section.

7. The optical disk according to claim 4, wherein the mark corresponds to any one of a notch, a hole, and a slit section.

8. The optical disk according to claim 5, wherein the mark corresponds to any one of a notch, a hole, and a slit section.

9. The optical disk according to claim 1, wherein the display sheet is effectively formed from a two-layer structure; that is, upper and lower layers; the lower layer is a base layer including a fluorescent substance, and the upper layer is a image print layer provided on the base layer so as to cover the same.

10. The optical disk according to claim 9, wherein the base layer is formed on the substrate in an isotropically uniform manner; the image print layer is formed from a plurality of blocks; and a space between the blocks is taken as a non-print section.

11. The optical disk according to claim 9, wherein one print image is formed from a plurality of blocks on the image print layer, and a space between the blocks is taken as a non-print section having transparency to light.

12. The optical disk according to claim 9, wherein different print images are formed into thumbnails in each block on the image print layer, and a space between said blocks is taken as a non-print section.

13. The optical disk according to claim 10, wherein the non-print section is formed from a grid pattern, a radial pattern, a concentric pattern, or a combination thereof.

14. A method for affixing a display sheet to a disk substrate, the method including:
affixing a display sheet on a opposite surface of the disk substrate, which has a recording layer formed on a surface of a substrate and a cover sheet applied over the recording layer, the opposite surface being opposite to the surface of the disk substrate covered with the cover sheet,
wherein a mark, which is provided on at least either the cover sheet or the substrate and indicates a direction of heat contraction of the cover sheet, is caused to coincide with a mark, which is provided on the display sheet and indicates a direction of heat contraction of the display sheet, thus affixing the display sheet on the opposite surface of the disk substrate.

15. The optical disk according to claim 1, wherein the physical characteristic is a physical dimension.

16. The optical disk according to claim 15, wherein the physical dimension is a diameter.

17. The optical disk according to claim 1, wherein the recording layer is formed of an organic-pigment-based material.

18. The optical disk according to claim 1, wherein the cover sheet is formed from polycarbonate, TAC, or polyethylene terephthalate.

19. The optical disk according to claim 1, wherein the display sheet is formed from polycarbonate, TAC, or polyethylene terephthalate.

* * * * *